US00RE37145E

(19) United States
(12) Reissued Patent
Barenboim et al.

(10) Patent Number: US RE37,145 E
(45) Date of Reissued Patent: Apr. 24, 2001

(54) APPARATUS FOR LASER TEXTURING DISKS

(75) Inventors: Michael Barenboim, Boca Raton, FL (US); Peter Michael Baumgart, San Jose, CA (US); Peter Paul Chrusch, Boynton Bch, FL (US); Benjamin Karni, San Jose, CA (US); Pieter J. M. Kerstens, Boca Raton, FL (US); Thao Anh Nguyen, San Jose, CA (US); Hong S. Seing, Boca Raton, FL (US); Andrew Ching Tam, Saratoga, CA (US)

(73) Assignee: International Business Machines Corporation, Armonk, NY (US)

(21) Appl. No.: 09/374,758

(22) Filed: Aug. 13, 1999

Related U.S. Patent Documents

Reissue of:
(64) Patent No.: 5,658,475
Issued: Aug. 19, 1997
Appl. No.: 08/613,564
Filed: Mar. 11, 1996

(51) Int. Cl.[7] ..... B23K 26/00
(52) U.S. Cl. ..... 219/121.77; 219/121.68; 219/121.82; 219/121.65
(58) Field of Search ..... 219/121.77, 121.6, 219/121.68, 121.76, 121.82, 121.83, 121.74; 425/174.4

(56) References Cited

U.S. PATENT DOCUMENTS 4,346,284 * 8/1982 Grollimund et al. ..... 219/121.77
4,574,180 * 3/1986 Kasner et al. ..... 219/121.77
4,638,144 * 1/1987 Latta, Jr. ..... 219/121.68
4,701,591 * 10/1987 Masaki et al. ..... 219/121.77
4,729,766 * 3/1988 Bergentz et al. ..... 219/121.69
4,964,242 * 10/1990 Ruble et al. ..... 451/306
5,062,021 * 10/1991 Ranjan et al. ..... 360/135
5,108,781 * 4/1992 Ranjan et al. ..... 427/556
5,425,611 * 6/1995 Hughes et al. ..... 414/217
5,486,134 * 1/1996 Jones et al. ..... 451/209
5,528,922 * 6/1996 Baumgart et al. ..... 73/1 J
5,539,213 * 7/1996 Meeks et al. ..... 250/559.23
5,567,484 * 10/1996 Baumgart et al. ..... 427/555
5,595,768 * 1/1997 Treves et al. ..... 425/174.4
5,981,902 * 11/1999 Arita et al. ..... 219/121.68
6,013,336 * 1/2000 Baumgart et al. ..... 427/555

* cited by examiner

*Primary Examiner*—Samuel M. Heinrich
(74) *Attorney, Agent, or Firm*—Ronald V. Davidge; Richard A. Tomlin

(57) ABSTRACT

A disk texturing tool is used, for example, to provide textured spots in an annular portion of both sides of a hardfile disk. Disks are moved into and out of the texturing process in cassettes, through two disk-handling stations. In each disk-handling station, a lifter raises each individual disk from the cassette. The individual disk is then transferred to a pick-and-place mechanism, which moves it to a spindle. The spindle spins and translates the disk, so that both sides of the disk are exposed to beams derived from a pulsed laser. The pick-and-place mechanism then returns the disk to the lifter, which lowers it into the cassette pocket from which it was taken. The pick-and-place mechanism simultaneously moves one disk from the lifter to the spindle and another from the spindle to the lifter. While disks are moved by the pick-and-place mechanism of one disk-handling station, a disk in the spindle of the other disk-handling station is exposed to the laser beams.

38 Claims, 4 Drawing Sheets

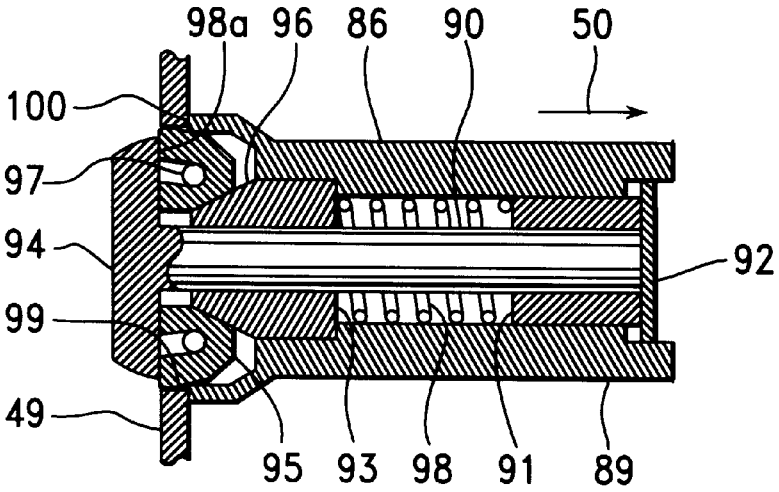
FIG. 8.
AMENDED

APPARATUS FOR LASER TEXTURING DISKS

Matter enclosed in heavy brackets [ ] appears in the original patent but forms no part of this reissue specification; matter printed in italics indicates the additions made by reissue.

CROSS-REFERENCE TO A BELATED APPLICATION

A co-pending U.S. application, Ser. No. 08/150,525, filed Nov. 10, 1993, now abandoned, entitled "Procedure Employing a Diode-Pumped Laser for Controllably Texturing a Disk Surface," by Peter M. Baumgart, et al., having a common assignee with the present invention, the disclosure of which is hereby incorporated by reference, describes a process for creating a "distant bump array" surface texture in a magnetic recording disk for reducing stiction, together with the disk so textured. The texturing process uses a tightly focused diode-pumped Nd:YLF or Nd:$YVO_4$ or other solid-state laser that is pulsed with a 0.3–90 nanosecond pulse train to produce a plurality of distantly-spaced bumps in the disk surface. The bump creation process is highly controllable, permitting repeated creation of a preselected bump profile, such as a smooth dimple or one with a central protrusion useful for low stiction without close spacing or elevated "roughness." Some bump profiles permit texturing of the data-storage region of the disk surface for low stiction without materially affecting magnetic data storage density.

BACKGROUND OF THE INVENTION

1. Field of the Invention

This invention relates to apparatus for fabricating a disk, such as a magnetic recording disk used in a computer hardfile, having a surface tenured by exposure to a pulsed laser, and, more particularly, to automated apparatus for moving a number of such disks through a station in which such texturing occurs.

2. Background Information

Current hardfile drives use a Contact Start-Stop (CSS) system allowing a magnetic head, used to read and write data, to contact the surface of a magnetic disk in a specific CSS region when the disk is stationary. Thus, before the rotation of a spinning disk has stopped, the magnetic head is moved to the CSS region, where the magnetic head settles on the surface of the disk. When the disk again starts to rotate, the magnetic head slides along the disk surface in this region, until the laminar air flow at the disk surface, due to its rotation, fully lifts the magnetic head from the disk surface.

After the magnetic head is lifted in this way, it is moved from the CSS region to another region of the disk to read and write data. The CSS region is preferably textured to minimize physical contact between the magnetic head and the disk surface. In this way, the contact stick-slip phenomenon often called "stiction" and other frictional effects are minimized, along with the resulting wear of the magnetic head surface. Outside the CSS region the remainder of the disk surface preferably retains a specular smoothness to permit high-density magnetic data recording.

3. Description of the Prior Art

U.S. Pat. No. 5,062,021, to Ranjan et al., describes a process in which magnetic recording media are controllably textured, particularly over areas designated for contact with data transducing heads. In conjunction with rigid disk media, the process includes polishing an aluminum nickel-phosphorous substrate to a specular finish, then rotating the disk while directing pulsed laser energy over a limited portion of the radius, thus forming an annular head contact band while leaving the remainder of the surface specular. The band is formed of multiple individual laser spots, each with a center depression surrounded by a substantially circular raised rim. The depth of the depressions and the height of the rims are controlled primarily by laser power and firing pulse duration. The shape of individual laser spots can be altered by varying the laser beam inclination relative to the disk surface. On a larger scale, the frequency of firing the laser, in combination with disk rotational speed controls the pattern or arrangement of laser spots. The smooth, rounded contours of the depressions and surrounding rims, as compared to the acicular character of mechanical textured surfaces, is a primary factor contributing to substantially increased durability of laser textured media.

SUMMARY OF THE INVENTION

In accordance with one aspect of the invention, there is provided equipment for texturing a disk including a central round hole, a circular periphery, and flat, parallel sides. The apparatus includes a cassette, a lifter, an indexing mechanism, a laser, an optical system, a spindle, and a pick-and-place mechanism. The cassette includes a number of pockets, each of which is open at a first end to allow the insertion of a single such disk. Each pocket also includes a lifter access opening opposite the first end. The lifter is movable through the lifter access opening in a pocket to engage a disk within the pocket. The lifter moves the disk through the first end of the pocket to a first disk transfer point. The indexing mechanism moves the cassette adjacent the lifter, so that the lifter can be moved within each of the pockets. The spindle engages the disk at a second disk transfer point. The pick-and-place mechanism moves the disk from the first disk transfer point to the second disk transfer point. The laser produces a pulsed laser beam.

In accordance with another aspect of the invention, there is provided equipment for texturing a number of such disks. The apparatus includes a laser, a beamsplitter, a beam steering mirror, first and second disk-handling stations, and a shuttling mirror assembly. The laser produces a pulsed laser beam, which is divided by the beamsplitter into first and second sub-beams. Beam-steering mirrors direct these sub-beams to travel parallel to one another. Each disk-handling station includes an exposure station in which portions of the opposite sides of the disks are exposed to the sub-beams. The shuttling mirror assembly, which reflects the first and second sub-beams, is movable between a first position, in which the sub-beams are directed to travel toward the exposure station of the first disk-handling station, and a second position, in which the first and second sub-beams are directed to travel toward the exposure station of the second disk-handling station.

BRIEF DESCRIPTION OF THE DRAWINGS

FIG. 8 is a longitudinal cross-sectional view of an end portion of a spindle, used to move disks through the texturing process in the tool of FIG. 4.

DETAILED DESCRIPTION

Figure 1:
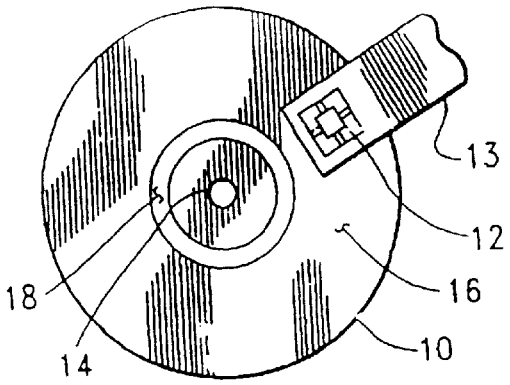
FIG. 1. PRIOR ART
FIG. 1 is a plan view of an internal portion of a prior-art disk drive unit, including a rotatable magnetic disk having a textured annular region for CSS operation, and a magnetic head.

FIG. 1 is a plan view of a portion of a disk drive unit from the prior art for a computing system, including a rotatable magnetic storage disk 10, together with a magnetic head 12, which is driven in a generally radial direction relative to the disk 10 by means of a drive arm 13. This disk 10 is an example of the type of product which can be made using the apparatus of the present invention. When the disk drive unit is in operation, disk 10 is rotated about its central hole 14, forming a laminar flow of air holding magnetic head 12 slightly away from the adjacent disk surface 16. Before this rotation is stopped, magnetic head 12 is driven to be adjacent to a textured annular region 18 of the surface of disk 10. As this disk rotation slows and stops, the frictional and stiction effects occurring between the surface of annular region 18 and the adjacent contacting surface of magnetic head 12 are minimized by the textured nature of the surface of this region 18. Subsequently, when the rotation of disk 10 is restarted, these effects are again minimized, as the rate of rotation of disk 10 increases until the laminar flow of air near its surface lifts the adjacent surface of magnetic head 12 completely away from the disk surface. Thus, as the rotation of disk 10 is stopped and subsequently restarted, the wear of the surface of magnetic head 12 is minimized. Disk 10 is preferably a double-sided magnetic storage disk, with a second side, opposite the side shown in FIG. 1, having similar features.

Figure 2:
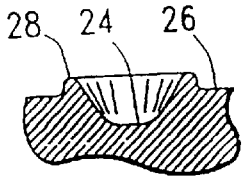
FIG. 2. PRIOR ART
FIGS. 2 and 3 are transverse cross-sectional views of individual textured spots, which form examples of spots which may be made using the apparatus of the present invention, with the spot of FIG. 2, being formed particularly according to the method of U.S. Pat. No. 5,108,781, and with the spot of FIG. 3 being formed particularly according to the method of co-pending U.S. Application Ser. No. 08/150,525.
Figure 3:
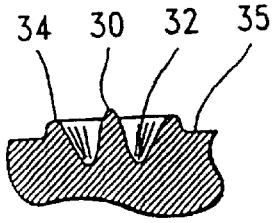

FIGS. 2 and 3 are transverse cross-sectional views of individual textured spots, which form examples of spots which may be made using the apparatus and method of the present invention.

FIG. 2 shows a portion of a disk surface roughened by the prior-art method taught by Ranjan, et al., in U.S. Pat. No. 5,062,021. With this method, a portion of the disk surface to be roughened is exposed to a pulse of laser light. The surface is heated rapidly, so that a part of the surface material is melted and then rapidly cooled, changing the surface topography to include a generally round central depression 24 below the nominal surface plane 26 and a generally round peripheral ridge 28 above this plane 26. The process described by Ranjan, et al. produces a ring of textured spots of this kind by repeatedly firing a laser as the disk being textured is rotated. The laser is then displaced radially through a pitch distance, and a second ring of textured spots, concentric with the first ring thereof, is produced. This process is repeated until texturing fills the annular region to be textured. The nature of each individual textured spot is determined primarily by the peak energy at which the laser is fired together with the pulse width. The distance between textured spots on the ring is determined by the relationship between the rate at which the laser is fired and the rotational speed at which the disk is turned.

FIG. 3 is a transverse cross-sectional profile of a laser textured spot produced using the method of the previously-described co-pending U.S. patent application, Ser. No. 08/150,525. The heights of surface features, compared to their widths, are exaggerated. A central protrusion 30 rises above the depth of the ring depression 32, preferably to a height somewhat greater than the height of the surrounding peripheral ring 34. The heights of the protrusion 30 and ring 34 above the nominally level surface 35 before texturing are determined by various laser and disk-material parameters, such as laser fluence, pulse width, spot size, and disk surface composition.

Figure 4:
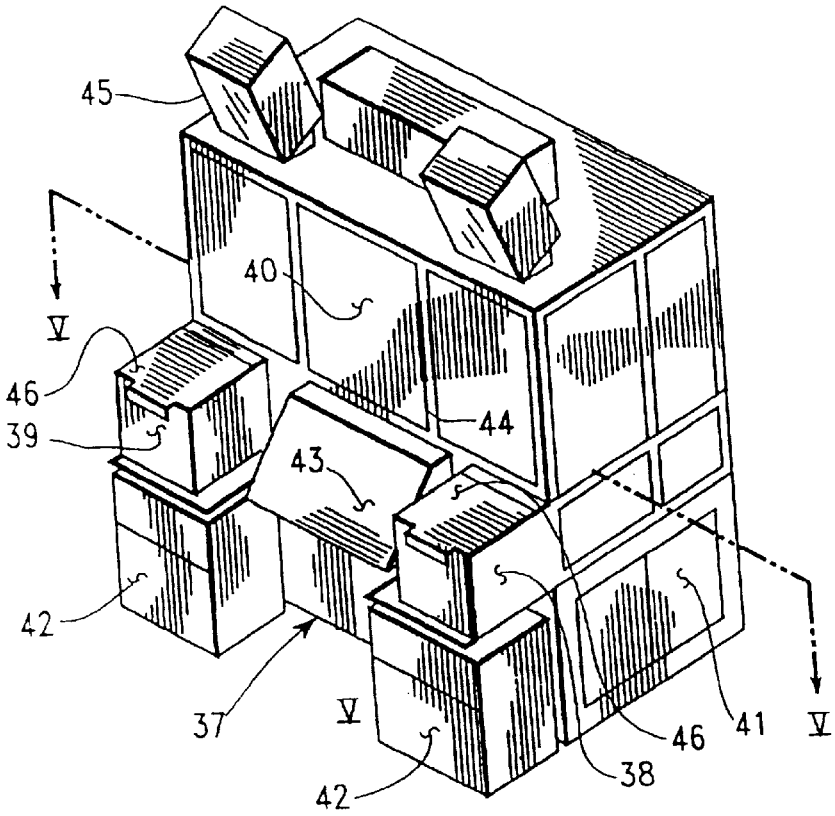
FIG. 4 is an isometric view of a laser disk texturing tool built in accordance with the present invention.

FIG. 4 is an isometric view of a laser-texturing tool 37, built in accordance with the present invention, which is used to apply laser-texturing to disks in a non-stop production mode as long as cassettes filled with disks are loaded and unloaded at a sufficient rate. These cassettes move through a right disk-handling station 38 and a left disk-handling station 39, with individual disks from these stations 38 and 39 being alternately textured by a single laser assembly in a laser-texturing station 40. A modular configuration allows the tool 37 to continue running, at a reduced rate of production, even if one of the disk-handling stations 38, 39 cannot be used.

The laser-texturing tool 37 is a self-contained system, with necessary electrical, electronic, and pneumatic components located in a base section 41 and in a pair of instrumentation cabinets 42. Various controls and output devices are placed on a slanted control panel 43. Since the infrared laser used in the texturing process produces invisible, potentially-harmful rays, a laser-texturing station 40 is housed in a light-tight cabinet within the tool 37, with a safety switch operated by the opening of each access door 44 turning off the laser. Furthermore, these doors 44 can be opened only when the tool is in a maintenance mode. The tool 37 is switched between automatic and maintenance modes by turning a mode switch (not shown) on control panel 43. Two television cameras (not shown), mounted within the laser-texturing station, allow the process to be viewed on a pair of monitors 45.

The upward-opening doors 46 of disk-handling stations 38 and 39, providing access for loading and unloading cassettes holding disks, are not interlocked, and may be opened or closed at any time, even during the operation of the texturing process. Within the tool 37, rays from the laser are blocked from the areas in which these cassettes are loaded and unloaded.

Figure 5:
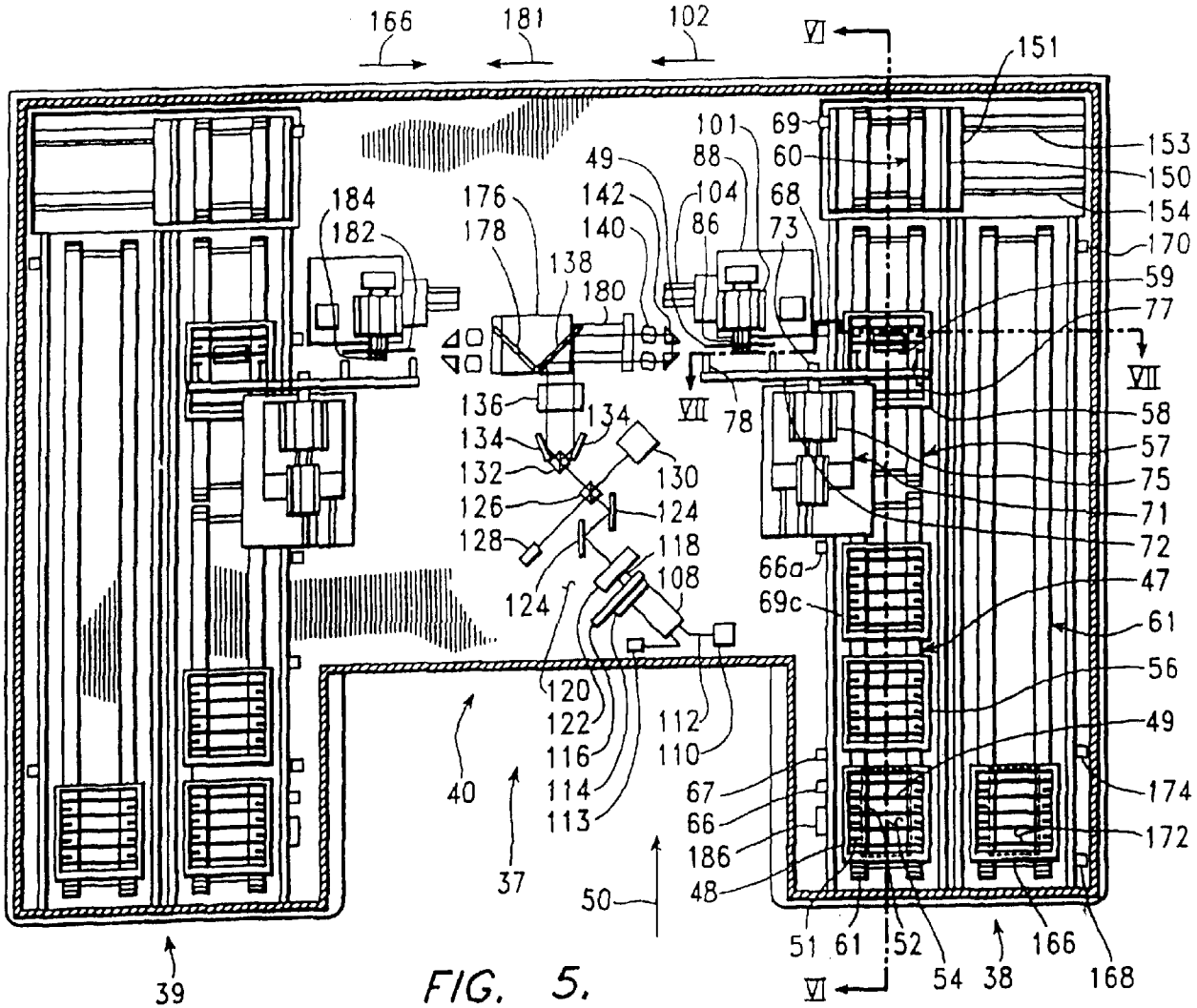
FIG. 5 is a cross-sectional plan view of the tool of FIG. 4, taken as indicated by section lines V—V in FIG. 4 to show disk-handling and laser-texturing stations thereof.

FIG. 5 is a horizontal cross-sectional view of laser-texturing tool 37, taken as indicated by section lines V—V in FIG. 4, to reveal particularly disk-handling stations 38, 39 and the laser-texturing station 40. Left disk-handling station 39 is a mirror image of right disk-handling station 38. Each disk-handling station 38, 39 has an input conveyor 47 carrying cassettes 48 loaded with disks 49 to be textured, rearward, in the direction of arrow 50. Each cassette 48 has a number of pockets 51 in which disks 49 are loaded in a vertical orientation, and a lower opening 52 allowing the removal of individual disks by lifting from below. While FIG. 5 shows cassettes having only five disks, for clarity, in reality a cassette for this system typically holds 25 disks.

Figure 6:
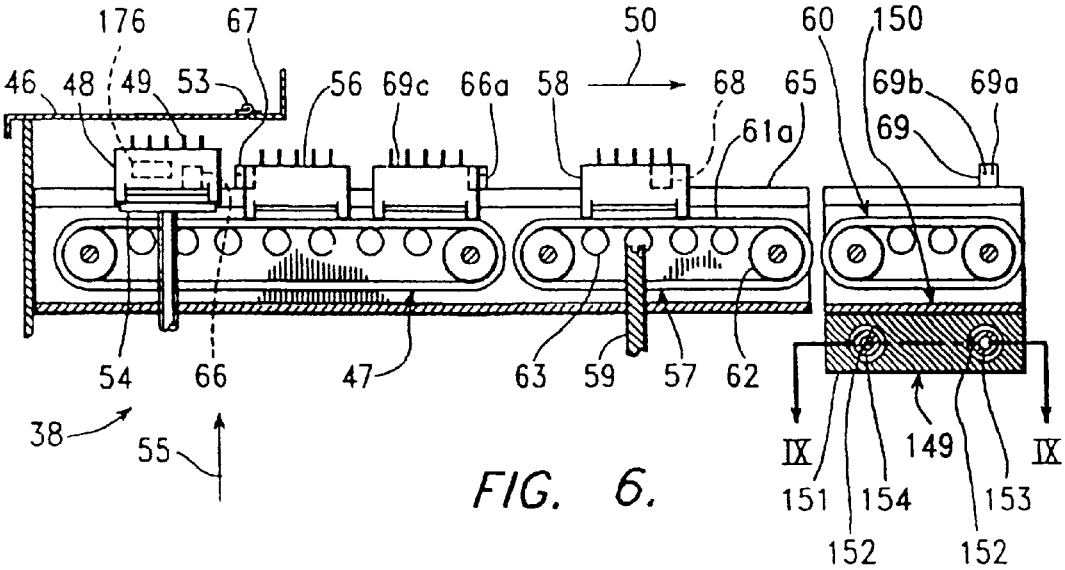
FIG. 6 is a cross-sectional side elevational view of the tool of FIG. 4, taken as indicated by section lines VI—VI in FIG. 5 to show mechanisms used to handle cassettes holding disks for texturing.

FIG. 6 is a cross-sectional side elevational view of the tool of FIG. 4, taken as indicated by cross-section lines VI—VI in FIG. 5, to show the conveyor systems moving cassettes filled with disks into and through the process. The tool operator loads a cassette 48 filled with disks 49 to be textured by opening the access door 46, which pivots upward along its rear hinge 53. The cassette 48 is normally loaded onto a raised platform 54, which, in this position holds the cassette 48 upward, in the direction of arrow 55, away from input conveyor 47, allowing this conveyor 47 to move another cassette 56 stored in a queue on the conveyor 47 without simultaneously moving the most-recently loaded cassette 48. FIG. 6 also shows a cassette indexing conveyor 57, which moves a cassette 58 in incremental motions above a disk lifter 59, so that the disk lifter 59 can remove individual disks 49 from the cassette 58 for placement into the laser-texturing process, and so that the disk lifter 59 can subsequently return textured disks to the cassette 58. FIG. 6 also shows a transfer table conveyor 60, which is used in the movement of cassettes filled with textured disks from indexing conveyor 57 to an output conveyor 61 (shown in FIG. 5).

Figure 7:
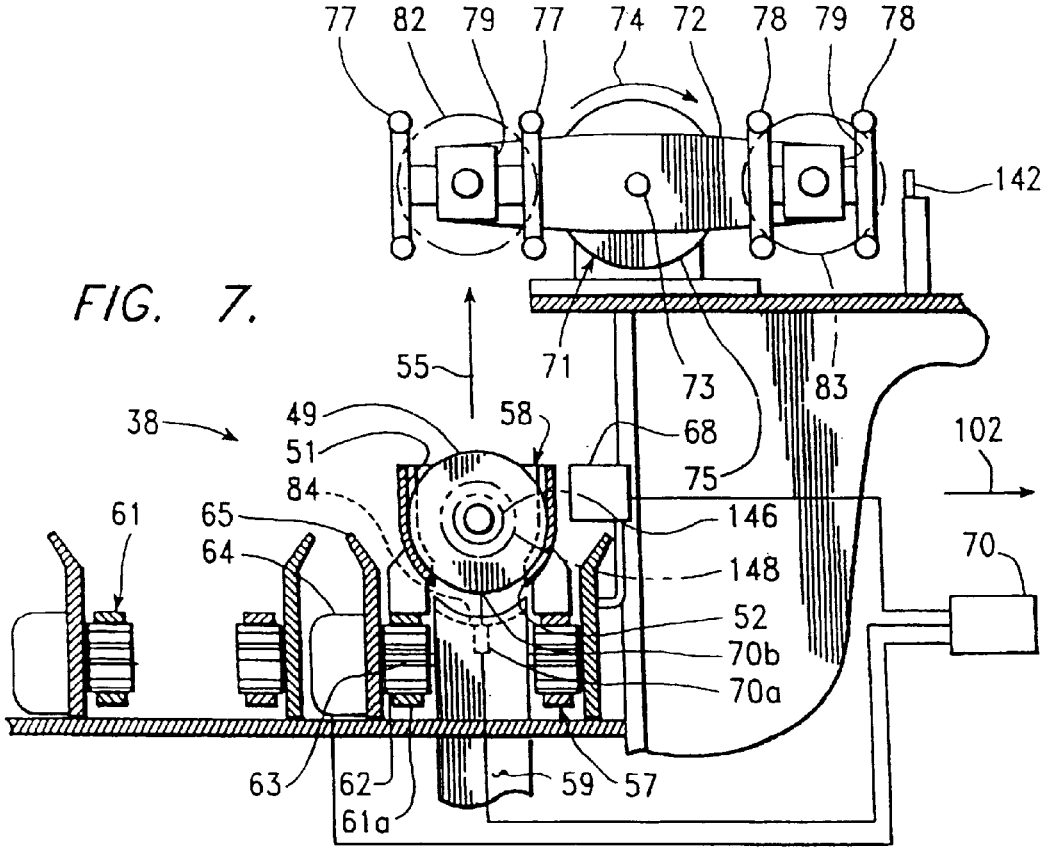
FIG. 7 is a cross-sectional rear elevational view of the tool of FIG. 4, taken as indicated by section lines VII—VII in FIG. 5 to show the mechanism used to transfer disks from cassettes within the disk-handling stations to the laser-texturing station and to return the disks to the cassettes.

FIG. 7 is a cross-sectional rear elevational view of the tool of FIG. 4, taken as indicated by section lines VII—VII in FIG. 5 to show the mechanism used to transfer disks from a cassette 58 within the disk-handling station 38 into the laser texturing process and to return textured disks to the cassettes. FIG. 7 also provides a transverse cross-sectional views of cassette indexing conveyor 57 and of output conveyor 61.

The movement of a cassette to the point at which individual disks are removed from the cassette to be carded into the texturing process will now be discussed, with particular reference being made to FIGS. 6 and 7.

Thus, referring to FIGS. 5, 6, and 7, each conveyor 47, 57, 60, 61 includes a belt 61*a* extending under each side of a cassette 48, 56, 58 loaded thereon. Each belt 61*a* extends between a pair of end rollers 62 and above a number of idler rollers 63. At one end of each conveyor 47, 57, 60, 61 the end rollers 62 are driven in either direction by a motor 64. This system for cassette transport also includes a pair of lateral guides 65, ensuring that each cassette stays in place atop the conveyors, and cassette detectors 66, 66*a*, 67, 68, 69, which determine when a cassette reaches an adjacent point along a conveyor system. Each cassette detector 66, 66*a*, 67, 68, 69 includes a light source 69*a* which is reflected off an adjacent surface of a cassette when such a surface is present, to be detected by a receiver 69*b*, which in turn provides an input to a computing system 70 controlling the operation of the motors 64 and other motors, solenoids, and valves within the laser-texturing tool 37 to effect operation as described herein.

When cassette 48 is placed on top of raised platform 54, its presence is detected by first input cassette detector 66. Since the input conveyor 47 and the system logic controlling its movement are configured to allow the queuing of cassettes, the subsequent movement of the cassette 48 is determined by whether other cassettes are already present on input conveyor 47 and indexing conveyor 57. If no cassette is already present on these conveyors 47, 57 (i.e., if cassettes 56, 58, and 69*c* are not present), platform 54 is lowered, so that the cassette 48 rests on top of input conveyor 47, and the conveyors 47, 57 are turned on to move cassette 48 rearward, in the direction of arrow 50. When indexing cassette detector 68 detects the presence of a cassette being moved in this way, input conveyor 47 and indexing conveyor 57 are stopped, leaving the cassette positioned so that the first of its pockets 51 in which diskettes 49 may be placed (i.e. the end pocket farthest in the direction indicated by arrow 50) is directly over disk lifter 59.

On the other hand, if a cassette 58 is present on indexing conveyor 57, and if no other cassette 56, 69*c* is present on input conveyor 47, when cassette 48 is placed on raised platform 54, this platform 54 is lowered, and conveyor 47 is turned on to move cassette 48 in the direction of arrow 50. This movement is stopped when the presence of the cassette 48 is detected by second input cassette detector 66*a*, leaving the cassette queued on the input conveyor 47, in the position in which cassette 69*c* is shown.

If a cassette 58 is present on indexing conveyor 57, and if a single cassette 69*c* is present on input conveyor 47, when cassette 48 is placed on raised platform 54, this platform 54 remains raised while input conveyor 47 is turned on to move cassette 69*c* opposite the direction of arrow 50 until this cassette 69*c* is sensed by third cassette sensor 67. Then, platform 54 is lowered, and input conveyor 47 is turned on to both cassettes 48, 69*c* in the direction of arrow 50. This movement is stopped when cassette 69*c* is detected by second cassette sensor 66*a*, leaving both cassettes 48, 69*c* queued on input conveyor 47.

Finally, if all three cassettes 56, 69*c*, and 58 are present on conveyors 47, 57 when cassette 48 is placed on raised platform 54, the movement of cassettes does not directly ensue, leaving cassettes 56, 69*c* queued on input conveyor 47 and cassette 48 queued on raised platform 54.

When the texturing process has been completed on all of the disks 49 to be textured within the cassette 58 on indexing conveyor 57, this conveyor 57 and transfer table conveyor 60 are turned on to move the cassette 58 rearward, in the direction of arrow 50, completely onto the transfer table conveyor 60. This motion is stopped when the presence of cassette 58 is detected by transfer table cassette detector 69. If cassette 56 is present on input conveyor 47, as determined by second input cassette detector 67, when cassette 58 is transferred from indexing conveyor 57 in this way, this queued cassette 56 is moved by conveyors 47, 57 to the point at which its presence is detected by indexing cassette detector 68. If a second queued cassette 48 is present on raised platform 54 when a first queued cassette 56 is moved from input conveyor 47 to indexing conveyor 57, platform 54 is lowered, and the first queued cassette 48 is driven by input conveyor 47 until the presence of the cassette 48 is detected by second input cassette detector 67.

The movement of an individual disk from a cassette into the texturing process will now be discussed, with particular reference being made to FIGS. 5 and 7.

Thus, referring to FIGS. 5 and 7, to allow the movement of individual disks 49 through the laser-texturing process, indexing conveyor 57 moves cassette 58 in a number of rearward and forward motions, in and opposite the direction of arrow 50, sequentially aligning the individual disk pockets 51 of the cassette 58 with a disk lifter 59. Disk lifter 59 includes a proximity sensing mechanism 70*a*, for determining whether a disk 49 is present in each pocket 51. This sensing mechanism 70*a* consists of an internal light source aimed at an adjacent edge 70*b* of a disk present in a pocket 51 and an internal sensor detecting light reflected from such an edge 70*b*. The output of sensing mechanism 70*a* provides an additional input to computing system 70. Thus, cassette 58 is moved to the rear, in the direction of arrow 50, by indexing conveyor 57, until proximity sensing mechanism 70*a* indicates the presence of a disk 49 in a particular pocket 51, passing any empty pockets 51 within the cassette 58. When a disk is detected by proximity sensing mechanism 70*a,* the rearward movement of cassette 58 is stopped, and the disk lifter 59 moves upward, in the direction of arrow 55, carrying the disk 49 which is aligned the lifter 59 upward for transfer to a pick-and-place mechanism 71.

Pick-and-place mechanism 71 has an arm 72 rotatable about the axis of a drive shaft 73, in and opposite the direction of arrow 74, in 180-degree increments. This rotation is effected by the incremental operation of arm drive motor 75. At each end of arm 72, a pair of grippers 77, 78 is movable between an open position, in which grippers 77 are shown, and a closed position, in which grippers 78 are shown, by means of a pneumatic actuator 79. When a pair of grippers 77, 78 is in the closed position, a disk placed between the grippers is held by four points around its periphery. When the pair of grippers is opened, a disk held in this way is released. The pick and place mechanism 71 is also moved rearward, in the direction of arrow 50, into a position in which disks are picked up and released, and forward, in the direction opposite arrow 50, into a position in which arm 72 is rotated.

The upward movement of disk lifter 59 carries a disk 49, which is to be textured next, upward into the location indicated by phantom line 82. This motion, which brings the disk 49 into vertical alignment with the open grippers 77 of arm 72, occurs with pick and place mechanism 71 in its forward position (i.e., moved opposite the direction of arrow 50), allowing the upward passage of disk 49 past grippers 77. At this point, the disk rests within a groove 84 of the lifter 59. Next, pick and place mechanism 71 moves in the direction of arrow 50 to its rearward position, aligning the open grippers 77 with the edge of disk 49. Then, grippers 77 are closed, grasping the disk 49. Disk lifter 59 next descends to disengage from the periphery of disk 49. Next, pick and place mechanism 71 moves opposite the direction of arrow 50 to its forward position, and the arm 72 rotates 180 degrees in the direction of arrow 74, placing disk 49 in the position indicated by phantom line 83, in axial alignment with a spindle 86 of a spindle assembly 88. Then, pick-and-place mechanism 71 returns in the direction of arrow 50 to its rearward position, placing the disk 49 on the end of spindle 86.

FIG. 8 is a longitudinal cross-sectional view of the end of spindle 86, which includes a rotationally-driven outer cylinder 89, in which an internal shaft 90 slides axially, in and opposite the direction of rearward-pointing arrow 50. A sliding bushing 91 and a piston 92, and a front end cap [93] *94* move axially with internal shaft 90, while a front bushing [94] *93* is held in place within the outer cylinder 89. A number of curved clamping blocks 95 extend around a truncoconical surface 96 of front bushing 93, being held inward, against this surface 96, by an elastomeric "O"-ring 97.

The internal shaft 90 is held in the rearward position shown (i.e. in the direction of arrow 50) by means of a compression spring 98 pressing an adjacent surface of the sliding bushing 91. With internal shaft 90 held rearward in this way, inner face [98] *98a* of end cap 94 pushes clamping blocks 95 rearward and outward, along truncoconical surface 96. This motion of the clamping blocks 95 grasps inner surface 99 of the disk 49, holding the disk in place against a front face 100 of outer cylinder 89. The disk 49 is released by applying a force to piston 92 in a forward direction, opposite the direction of arrow [90] *50*, to overcome the force exerted by compression spring 98, so that the internal shaft 90 is moved forward, opposite the direction of arrow 90. This force may be applied by a number of well known methods, such as through a pneumatically operated push-rod operating on piston 92. The resulting movement of end cap 94 allows the clamping blocks 95 forward and inward, releasing disk 49 from the spindle 86.

Referring to FIGS. 5, 7, and 8, pick-and-place mechanism 71 next moves to the rear, in the direction of arrow 50, placing the disk 49 to be textured, which is now at the position indicated by phantom line 83 in FIG. 7, on end cap [90] *94* of spindle 86, with inner shaft 90 held in its forward position, so that clamping blocks 95 are retracted inward. Next, inner shaft 90 is moved to its rearward position, so that clamping blocks 95 are moved outward, clamping the disk 49 in place, and the grippers, which have been holding the disk on arm 72, open, releasing the disk 49. After disk 49 is placed on spindle 86, the pick-and-place mechanism 71 moves forward, opposite the direction of arrow 50, and the spindle drive motor 101 of spindle assembly 88 begins to rotate spindle 86 to bring the disk 49 up to a rotational velocity at which exposure to laser pulses will occur. The spindle assembly 88 also begins to move inward, in the direction of arrow 102, being driven by a spindle translation motor 104, carrying the disk 49 into the texturing process.

The laser-texturing station 40 will now be discussed, with specific references being made to FIG. 5.

Thus, referring to FIG. 5, within the laser-texturing station 40, a beam from an infrared pulsed laser 108 is used to produce the desired surface texturing on the disk 49. As described in the co-pending application referenced above, the laser 108 may be, for example, a Nd:YLF solid state laser, providing an output at a wavelength of 1.047 microns, or Nd:$YVO_4$ solid state laser, operated with a diode pumping signal, driven from a laser diode 110 through a fiber-optic cable 112, and pulsed by a Q-switch control 113. A beam from the laser 108 is directed through an electronic process shutter 114 and a mechanical safety shutter 116. When the laser-texturing station 40 is operating, a train of laser pulses is emitted from the laser 108, with the actual texturing process being stated and stopped by opening and closing the electronic process shutter 114. The safety shutter 116 remains open during the entire texturing process, unless an error condition, such as jam of a disk or cassette, occurs. The detection of such an error condition causes the safety shutter 116 to close, by means of the software running the laser-texturing tool 37. The laser 108, electronic process shutter 114, and safety shutter 116 together form a light-tight assembly, from which even a portion of the laser beam cannot escape when either shutter 114, 116 is closed.

After passing through the shutters 114, 116, the laser beam enters a polarizing beamsplitter 118, which is oriented so that the portion of the laser beam, if any, having an unwanted p-polarization is directed downwards toward an underlying plate 120, leaving the portion of the laser beam having a vertical s-polarization to propagate through the remaining optical path. Next, the laser beam passes through a 3X beam expander/collimator 122, which permits the adjustment of the infrared laser spot size at a lens entrance. From expander collimator 122, the laser beam is directed by a pair of dielectric-coated steering mirrors 124 to a dichroic beamsplitter 126. A visible laser beam, for example from a 2-mW laser diode 128, is also directed toward the beamsplitter 126, permitting alignment of the optical system by tracing the red laser dot. The infrared beam from laser 108 is made to be coincident with the red beam from laser diode 128 by manipulating the two steering mirrors 124. About three percent of the laser beam entering beamsplitter 126 126 to a power detector 130, which provides in-situ monitoring of the laser power.

The infrared laser beam leaving the dichroic beamsplitter 126 is directed to a non-polarizing beamsplitter cube 132, which splits the beam into two beams that are equal in intensity within five percent. These two beams are directed, by means of a pair of steering mirrors 134, toward opposite sides of the disk being carried through the texturing process by spindle assembly 88. After reflection off these steering mirrors 134, the laser beams travel as a pair of parallel beams, separated by a distance of 25 mm, to enter a power control optics block 136, in which the intensity of the two beams is balanced by controlling the voltage applied to liquid-crystal variable retarders. In this way the intensity of the parallel laser beams leaving the power control optics block 136 is made equal within one percent.

In the example of FIG. 5, the parallel laser beams from power control optics block 136 are reflected off a right shuttling mirror 138, being directed toward a disk carried through the texturing process from the right disk-handling station 38. Each of these beams passes through a focussing achromatic triplet lens 140, having a focal length of 25.4 mm, and is reflected toward the surface of the disk being textured by a right-angle prism 142. Each lens 140 is mounted on a finely adjustable stage, permitting the adjustments needed to center the beam and to achieve optimum focus on each side of the disk. Each prism 142 is slightly tilted, so that a laser beam reflected off the surface of the disk being textured is not transmitted back through the optical path.

The movement of a disk through the laser-texturing process, and its subsequent return to the cassette from which it has been taken, will now be discussed, with particular reference being made to FIGS. 5 and 7.

Thus, referring to FIGS. 5 and 7, the disk 49 clamped to spindle 86 is first brought up to the rotational speed desired for the texturing process, as the motion of spindle assembly 88 drives the disk 49 inward, in the direction of arrow 102, to or past the point at which the inner diameter, indicated on FIG. 7 by phantom line 146, of the surface to be textured is adjacent to the point at which exposure will occur to laser beams reflected from prisms 142. The actual exposure, which is started by opening electronic process shutter 114, occurs as the disk 49 is rotated, for example, at a constant speed, by spindle drive motor 101 and as the disk 49 is moved in the outward direction, opposite arrow 102, for example, at a constant speed, by the spindle translation motor 104. When the disk 49 passes the point at which the outer diameter, indicated by phantom line 148, of the surfaces to be textured is adjacent to the point at which exposure occurs to laser beams reflected from prisms 142, electronic process shutter 114 is closed to terminate the exposure of the surfaces of disk 49 to the laser beam. Thus, an annular space on disk 49 is textured by placing a number of laser-generated texture patterns along a spiral, with the distance between the patterns adjacent along the spiral being determined by the rate at which laser 108 is pulsed, and by the rate of rotation of spindle 86, while the distance between radially adjacent segments of the spiral is determined by the rates of rotation and translation of spindle 86.

After completion of the texturing process, the rotation of spindle 86 is stopped, or allowed to decelerate, as the spindle assembly 88 continues moving outwardly, opposite arrow 102, to stop in the position adjacent to grippers 78, at the inward-extending end of the arm 72. At this point, the arm 72 is held forward, in the direction opposite arrow 50, so that the disk 49 can pass behind the grippers 78, which are held open. When this outward motion of spindle assembly 88 is complete, and when the rotational motion of spindle 86 is fully stopped, the arm 72 is moved rearward, and the grippers are closed to engage the disk 49. Next, the shaft 90 (shown in FIG. 8) is moved forward so that the clamping blocks 95 (also shown in FIG. 8) are retracted inward, releasing the disk 49 from spindle 86. Then, the arm 72 is moved forward, opposite the direction of arrow 50, and arm 72 is rotated 180 degrees about the axis of its drive shaft 73, opposite the direction of arrow 74, and the arm 72 is moved rearward, in the direction of arrow 50, moving the disk 49, which has most recently been textured, into position above the disk lifter 59. Next, lifter 59 moves upward, accepting the textured disk in its groove 84. The grippers on arm 72 holding the textured disk are opened, and the lifter 59 then descends, placing the textured disk 49 in a pocket 51 within the cassette 58.

The preceding discussion has described the movement of a single disk 49 from the cassette 58, in right disk-handling station 38, through the texturing process in laser-texturing station 40, and back into the cassette 58. In a preferred version of the present invention, two disks are simultaneously moved in opposite directions between the cassette 58 and the spindle 86, which carries each disk through the texturing process. This type of disk movement will now be described, with particular references being made to FIGS. 5 and 7.

Referring to FIGS. 5 and 7, except during the movement of the first and last disks 49 held within an individual cassette 58, each rotational movement of arm 72 in or opposite the direction of arrow 74 preferably carries one disk 49 from the disk lifter 59 to spindle 86 within grippers 77, while another disk 49 is simultaneously carried within grippers 78 from the spindle 86 to disk lifter 59. Sequential rotational movements of arm 72, which are similar in their movement of disks, occur in opposite rotational directions to avoid the winding of air hoses to actuators 79 and of wires to grippers 77, 78, which would occur if such movements were to continue in one direction.

Furthermore, a preferred version of the present invention returns each textured disk 49 to the cassette pocket 51 from which it has been taken, leaving the pockets 51 which have been determined to be empty by proximity sensor **70*a* in an empty condition. These conditions are achieved in a preferred version of the present invention, by allowing the simultaneous movement of two disks 49 by the pick and place mechanism 71, and by using the indexing conveyor 57 to return cassette 58 to the position in which disk lifter 59 accesses the pocket from which a disk 49 was taken before replacing the disk 49 in the cassette 58**.

As a disk 49, which is hereinafter called the "A" disk 49 for convenience, is being taken through the texturing process by spindle 86, a "B" disk 49, which is the next disk 49 in the direction opposite arrow 50 past the cassette pocket 51 from which the "A" disk 49 has been taken, is found by movement of the cassette 58 in the direction of arrow 50 past the proximity sensor **70*a*. At this point, the movement of cassette 58 is stopped, and disk lifter 59 moves the "B" disk 49 upward, into the position indicated by phantom line 82. When the process of texturing the "A" disk 49 is finished, spindle 86 moves the "A" disk 49 into the position indicated by phantom line 83. When both the "A" and "B" disks 49 have been positioned in this way, pick-and-place mechanism 71 moves to the rear, in the direction of arrow 50, and both sets of grippers 77, 78 are closed to grasp the "A" and "B" disks 49. Within the spindle 86, shaft 90 (shown in FIG. 8) is moved to the front, moving clamping blocks 95 inward to disengage the spindle from the "A" disk 49, and the disk lifter 59 moves downward to disengage from the "B" disk 49. Next, the pick-and-place mechanism 71 moves forward, opposite the direction of arrow 50, and the arm rotational drive motor 75 drives aim 72 through a 180-degree angle in the direction of arrow 74. Now, the positions of the "A" and "B" disks 49 are reversed, with the "A" disk 49 being positioned for movement through the texturing process on spindle 86, and with the "B" disk 49 being positioned for return to cassette 58. Next, pick-and-place mechanism 71 moves to the rear, in the direction of arrow 50, placing the "B" disk 49 on spindle 86, and aligning the "A" disk 49 with disk lifter 59**.

Thus, a first disk transfer point is established at the disk location shown by phantom line 82, and a second disk transfer point is established at the disk location shown by phantom line 83, both with pick-and-place mechanism 71 moved to the rear, in the direction of arrow 50. At the first disk transfer point, a disk 49 is transferred in either direction between pick-and-place mechanism 71 and disk lifter 59. At the second disk transfer point, a disk 49 is transferred in either direction between pick-and-place mechanism 71 and spindle 86.

In a preferred mode of operation, computing system 70 stores data indicating the pocket 51 within cassette 58 from which each disk is taken. This data is subsequently used to determine how the cassette 58 is moved opposite the direction of arrow 50 to return to the place from which the "A" disk 49 has been taken. When a cassette full of disks to be textured has been loaded into the disk-handling station 38, the cassette is moved one pocket position in the direction opposite that of arrow 50, from the position in which the pocket at which "B" disk 49 has been taken is directly above disk lifter 59, to the position in which the pocket at which "A" disk 49 has been taken is above disk lifter 59. If the cassette 58 was not full of disks 49 to be textured when it was loaded into disk-handling station 48, the cassette 58 may have to be moved farther than one pocket position opposite the direction of arrow 50. In any case, the cassette is moved so that the pocket from which the "A" disk 49 was taken is above disk lifter 59, using disk position data stored within computing system 70 and moving the cassette using indexing conveyor 57. This cassette movement can occur as the "A" disk is being moved, by pick-and-place mechanism 71, into place for reinsertion into the cassette 58, with the pick-and-place mechanism 71 moved forward, opposite the direction of arrow 50.

Next, disk lifter 59 moves upward, engaging "A" disk 49 within its groove 84, and the shaft 90 (shown in FIG. 8) is moved rearward, in the direction of arrow 50, so that clamping blocks 95 are extended outward to hold "B" disk 49 (also shown in FIG. 8) on the spindle 86. The grippers holding the "A" disk are opened, and disk lifter 59 moves downward, restoring "A" disk 49 into the pocket 51 from which it was taken, and spindle 86 moves inward, in the direction of arrow 102, while rotationally accelerating the disk to the rotational velocity at which texturing will occur. In this way, preparations are made to texture the next disk 49, which is, at this time, the "B" disk.

The first disk 49 taken from each individual cassette 58 is moved alone from disk lifter 59 to spindle 86, without the simultaneous movement of another disk 49 in the opposite direction, since there is no other disk available for such movement. Similarly, the last disk 49 taken from each individual cassette 58 is moved alone from spindle 86 to disk lifter 59, since there is no other disk available for movement in the opposite direction. The determination that the last disk 49 to be textured has been removed from the cassette 58 is made when the last pocket 51 into which disks 49 can be placed is moved past disk lifter 59 without the detection of another disk 49 by proximity sensor 70*a*. Only a single cassette 58 at a time is moved onto indexing conveyor 57, with all of the disks 49 to be textured within the cassette 58 being removed from the cassette 58, sent through the texturing process, and returned to the cassette 58 before any of the disks 49 in the next cassette 58 are so processed.

Figure 9:
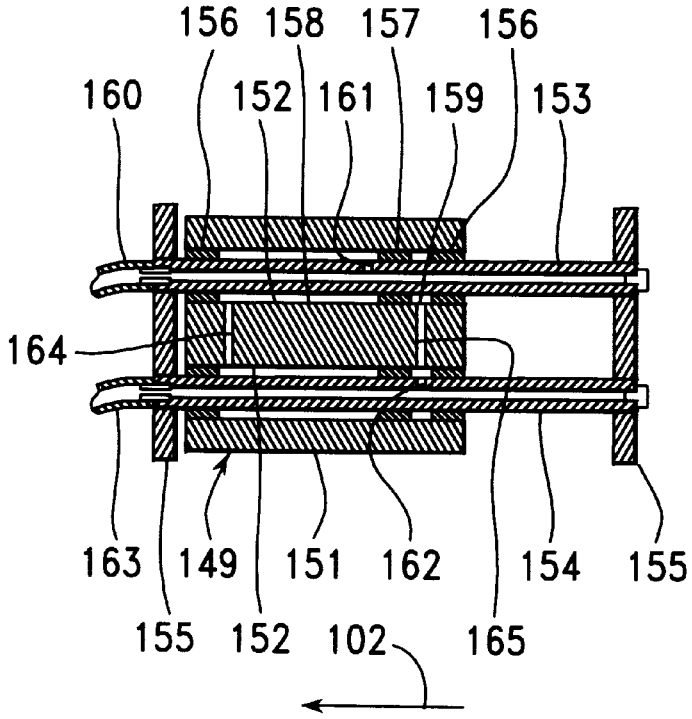
FIG. 9 is a cross-sectional plan view of a slider used to move cassettes filled with textured disks from one conveyor to another in the tool of FIG. 4.

FIG. 9 is a cross-sectional plan view of a slider mechanism 149 used to move a transfer table 150 on which cassettes are transferred from indexing conveyor 57 to output conveyor 61, taken as indicated by section lines [IF—IF] *IX—IX* in FIG. 6.

Referring to FIGS. 6 and 9, the transfer table 150 is mounted atop slider mechanism 149, including a slider 151, having a pair of cylinders 152, through which a pair of hollow shafts 153, 154 extend. The shafts 153, 154 are in turn mounted to extend between end blocks 155. The slider 151 is slidably mounted on the shafts 153, 154 by means of bearing assemblies 156, which also include air-tight seals preventing the outward flow of air from the ends of cylinders 152. A central piston 157 is also attached to slide with the slider 151 along each shaft 153, 154. Each piston 157 includes seals separating the cylinder 152, within which it is attached, into an inward chamber 158 and an outward chamber 159, each of which is alternately filled with compressed air or exhausted to effect movement of the slider 151.

To move slider 151 inward, in the direction of arrow 102, compressed air is directed to the inward chambers 158, from hose 160, through a hole 161 in shaft 153. As this occurs, air is exhausted from outward chambers 159, through a hole 162 in shaft 154, and through hose 163. Both inward chambers 158 are connected by an inward transverse hole 164, and both outward chambers 159 are connected by an outward transverse hole 165. Thus, as compressed air is directed through hose 160 while hose 163 is exhausted to the atmosphere, the resulting expansion of inward chambers 158, together with a contraction of outward chambers 159, moves slider 151 inward, in the direction of arrow 102, aligning transfer table conveyor 60 with indexing conveyor 57.

Similarly, to move slider 151 outward, opposite the direction of arrow 102, compressed air is directed to the outward chambers 159, from hose 163, through hole 162 in shaft 154. As this occurs, air is exhausted from inward chambers 158, through hole 161 in shaft 153, and through hose 160. Thus, as compressed air is directed through hose 163 while hose 160 is exhausted to the atmosphere, the resulting expansion of outward chambers 159, together with a contraction of inward chambers 158, moves slider 151 outward, opposite the direction of arrow 102, aligning transfer table conveyor 60 with output conveyor 61.

The movement of a cassette 58 following the return thereto of all disks 49, having been textured, will now be discussed, with specific references being made to FIGS. 5, and 6.

Thus, referring to FIGS. 5 and 6, when it is determined that the last disk 49 to be textured in a cassette 58 has been processed and returned to the cassette 58, both intermediate conveyor 57 and transfer table conveyor 60 are turned on to move the cassette 58 rearward, in the direction of arrow 50, until the cassette 58 is completely on transfer table conveyor 60, as indicated by the output of transfer table cassette sensor 69. Upon the indication of sensor 69, movement of conveyors 57 and 60 is stopped, and a slider mechanism 149 is operated to drive the transfer table 150, which includes transfer table conveyor 60, in an outward direction, opposite the direction of arrow 102 along hollow shafts 153, 154. After this motion is stopped with transfer table conveyor 60 in alignment with output conveyor 61, the conveyors 60, 61 are turned on to move cassette 58 to the front, opposite the direction of arrow 50. If other cassettes are not stored along the output conveyor 61, this movement is stopped when the cassette has been brought to the front of the conveyor 61, to the position in which cassette 166 is shown in FIG. 5, as indicated by a first output cassette sensor 168. At this point, the cassette 166, with processed disks 49, is ready for removal from the disk texturing tool 37.

Continuing to refer to FIG. 5, while this condition of readiness is preferably communicated to the system operator through a visible or audible indication, the removal of a cassette 166 with textured disks 49 is not generally required to permit continued operation of the disk texturing tool 37. Space is provided along output conveyor 61 for the storage of a number of cassettes 166 filled with textured disks 49. In a first version of this output system, all such cassettes 166 are stored along the surface of output conveyor 61. In a second version of this output system, the first cassette to reach the front of output conveyor 61 is stored on a raised platform.

The operation of the first version of this output system will now be described. In this version, if a cassette 166 is waiting for removal at the front of output conveyor 61 when the processing of disks 49 within another cassette 58 is completed, output conveyor 61 is turned on to move the cassette 166 rearward, in the direction of arrow 50. This movement is stopped when the presence of cassette 166 is detected by a second output cassette sensor 170. Then, with transfer table conveyor 60 in alignment with output conveyor 61, both transfer table conveyor 60 and output conveyor 61 are turned on to move cassettes 166 and 58 together to the front of conveyor 61, where this motion is stopped as first output cassette sensor 168 detects the presence of cassette 166. If necessary, this process is repeated several times, until output conveyor 61 is filled with a queue of cassettes holding disks 49 which have completed the texturing process. In each case, the rearward motion of output conveyor 61, in the direction of arrow 50, is stopped when the rearmost cassette in the queue reaches second output cassette sensor 170, and the subsequent forward motion of output conveyor 61 is stopped when the forwardmost cassette in the queue reaches first output cassette sensor 168.

The operation of the second version of this output system will now be described. This version requires an additional cassette lifting platform 172, which is similar to the platform 54 used with input conveyor 47, and a third output cassette sensor 174. With this version, the first cassette 166 to reach the end of output conveyor 61 is raised off the conveyor with lifting platform 172, to remain in a raised position until it is removed by the tool operator. With a cassette 166 in the raised position, output conveyor 61 is operated in both directions while not affecting the position of the cassette 166. Thus, when a second cassette, such as cassette 58, is loaded onto output conveyor 61, this conveyor 61 is turned on to drive the cassette forward, in the direction opposite arrow 50. This motion is stopped when the cassette is detected by third output cassette sensor 174. When the disks in a third cassette are completed, output conveyor 61 is turned on to drive the second cassette rearward. This motion is stopped when the second cassette is detected by second output cassette sensor 170. Then both transfer table conveyor 60 and output conveyor 61 are turned on to move the second and third cassettes forward, opposite the direction of arrow 50, until the second cassette is detected by third output cassette sensor 174.

Again, this process is repeated until output conveyor 61 is filled with a queue of cassettes holding disks 49 which have completed the texturing process. In each case, the rearward motion of output conveyor 61, in the direction of arrow 50, is stopped when the rearmost cassette in the queue reaches second output cassette sensor 170, and the subsequent forward motion of output conveyor 61 is stopped when the forwardmost cassette in the queue reaches third output cassette sensor 174. These movements occur as the first cassette 166 remains on raised platform 172.

At any point, if the cassette 166 on platform 172 is removed by the tool operator with one or more cassettes remaining on output conveyor 61, the conveyor 61 is turned on to drive the next cassette to the end of the conveyor 61, as detected by first output cassette sensor 168. The platform 172 is again raised to lift this cassette off output conveyor 61.

The methods described above for handling cassettes provide the particular advantage of not operating any conveyor system 47, 57, 60, 61 in sliding contact with a cassette. The generation of wear particles from relative motion between conveyor systems and cassettes is therefore avoided. Such wear particles could otherwise contaminate the manufacturing process of which this texturing is a part. Furthermore, the useful life of conveyor belts and cassettes is increased, with cassettes and conveyor belts being likely to last as long as various other moving parts of the disk texturing tool 37.

The configuration of output conveyor 61 extending alongside input conveyor 47 provides the advantage of bringing output cassettes, holding disks which have gone through the texturing process, back to a place adjacent to the place where input cassettes are loaded. This facilitates servicing the tool 37 by personnel who must both load and unload cassettes. Furthermore, additional space for queuing cassettes along the conveyors is gained without having to increase the length of the tool 37 along the conveyors.

The preceding discussion of the movement of cassettes and disks has focussed on such movement within right disk-handling station 38 of the laser-texturing tool 37. Thus, the various movements of disks and cassettes described above are used alone if the left disk-handling station 39 is not available. For example, the left disk-handling station may not be available due to a technical problem, or simply because cassettes have not been loaded into it. Furthermore, an embodiment of the present invention has only a single disk-handling tool, which is operated is described in detail above. Nevertheless, in the preferred method of operation of the preferred embodiment of the present invention, which will now be described with particular reference being made to FIG. 5, both right disk-handling station 38 and left disk-handling station 39 are used in an alternating fashion to present disks to be textured within laser-texturing station 40.

Thus, referring to FIG. 5, in a preferred version of the present invention, the operation of left disk-handling station 39 is generally the same as operation of right disk-handling station 38, with various elements of the apparatus within the left disk-handling station 39 being mirror image configurations of corresponding elements within the right disk-handling station 38. The preceding discussion of operations within right disk-handling station 38 is equally applicable to operations within left disk-handling station 39, with rearward motions, in the direction of arrow 50, remaining the same, and with inward motions, in the direction of arrow 102 continuing to be directed toward the center of the laser texturing tool 37, in the direction of arrow 166, within left disk-handling station 39. Similarly, forward motions, opposite the direction of arrow 50 are in the same direction in both left and right disk-handling stations 38, 39, while outward motions in left disk-handling station 39 are opposite the direction of arrow 166.

Within disk-texturing station 40, right shuttling mirror 138 is mounted on a mirror slide 176, together with a left shuttling mirror 178. Mirror slide 176 is operated pneumatically, sliding on a pair of shafts 180, using a mechanism operating generally as described above in reference to FIG. 9. With mirror slide 176 in its leftward position, moved in the direction of arrow 181 as shown in FIG. 5, the laser beams passing through power control optics block 136, having been derived from the output of infrared laser 108, are directed to disk 49, clamped on spindle 86 of right disk-handling station 39, as previously described. Mirror slide 176 is alternately moved into a rightward position, so that the laser beams passing through power control optics block 136 reflect off left shuttling mirror 178, being directed to a disk 182 held by spindle 184 of left disk-handling station 39. In this way, the laser beams employed in the disk texturing process are directed to either disks within the right disk-handling station 38 or left disk-handling station 39 simply by moving mirror slider 176.

While the above discussion describes the use of a sliding mechanism having two mirrors to direct the laser beams between the two disk-handling stations 38, 39, a single pivoting mirror could alternately be used for this purpose.

The operation of right disk-handling station 38, which has been described in some detail above, may be considered to consist basically of disk-movement cycles alternating with texturing cycles, wherein each disk movement cycle consists of the movement of one or two disks by pick-and-place mechanism 71, and wherein each texturing cycle consists of the movement of a single disk on the spindle 86. Whenever sufficient disks are available for texturing to allow the disk texturing tool 37 to operate at full capacity, each disk-movement cycle of right disk-handling station 38 occurs simultaneously with a texturing cycle of left disk-handling station 39, and each disk-movement cycle of left disk-handling station 39 occurs simultaneously with a texturing cycle of right disk-handling station 38. In this way, the use of the texturing process available through operation of infrared laser 108 is maximized, along with the overall process speed of the laser texturing tool 37. However, when disks to be textured are not available from one of the disk-handling stations 38, 39, the other disk handling station can continue to run at its full speed.

Referring to FIGS. 5–7, a preferred version of the present invention includes a bar code scanner 186 for reading bar code labels (not shown) placed on a side of a cassette 48, which is put on platform 54. To use this feature, the computing unit 70 executes a program relating bar codes read by scanner 186. Data gathered by reading bar code labels may be stored and used by an inventory control system to keep track of work in process.

The present invention provides advantages of optimized productivity and flexibility. In a preferred mode of operation, both disk-handling stations 38, 39 are simultaneously used as described above, maximizing the rate of production for the laser texturing tool 37. The use of laser 108 is optimized, with various disk-handling processes in each disk-handling station 38, 39 occurring while a disk 49, 172 in the other disk-handling station is being exposed to the laser. The use of separate disk-handling stations also provides flexibility; if either of the disk-handling stations 38, 39 is disabled, production can continue at a reduced rate using the other disk-handling station. A single disk-handling station 38, 39 can also be used, if desired, when untextured disks sufficient for the use of both stations are not available for the process.

While the invention has been described in its preferred form or embodiment with some degree of particularity, it is understood that this description has been given only by way of example and that numerous changes in the details of construction, fabrication and use, including the combination and arrangement of parts, may be made without departing from the spirit and scope of the invention. For example, the pneumatic sliders described in reference to FIG. 9 may be replaced by a number of well-known methods for achieving and controlling movement, such as electric motors driving leadscrews.

What is claimed is:

1. Apparatus for texturing a disk including a central round hole, a circular periphery, and flat, parallel sides, wherein said apparatus comprises:

a cassette including a plurality of pockets, wherein each said pocket is open at a first end to allow the insertion therein of a single said disk, and wherein each said pocket includes a lifter access opening opposite said first end;

a lifter movable through said lifter access opening to engage said disk in a pocket within said plurality thereof, wherein said lifter moves said disk through said first end to a first disk transfer point;

indexing means for moving said cassette adjacent said lifter so that said lifter is movable within each of said pockets;

a laser producing a pulsed laser beam;

an optical system directing a portion of said laser beam to a first exposure point;

a spindle engaging said disk at a second disk transfer point and moving said disk past said first exposure point; and a pick-and-place mechanism, moving said disk from said first disk transfer point to said second disk transfer point.

2. The apparatus of claim 1:

wherein said spindle additionally returns said disk to said second disk transfer point;

wherein said pick-and-place mechanism additionally returns said disk from said second disk transfer point to said first disk transfer point; and wherein said lifter additionally engages said disk at said first disk transfer point and returns said disk to a pocket within said plurality thereof.

3. The apparatus of claim 2, wherein said pick-and-place mechanism comprises:

an arm rotatable by means of an arm drive shaft about an axis of said arm drive shaft, wherein said arm extends through equal distances in opposite directions from said arm drive shaft;

a gripper mechanism at each end of said arm, adapted to grip and to release said disk;

arm drive means rotating said arm through a 180-degree angle between a first arm rotational position, in which a first said gripper mechanism is in alignment with said first disk transfer point while a second said gripper mechanism is in alignment with said second disk transfer point, and a second arm rotational position, in which said first said gripper mechanism is in alignment with said second disk transfer point while said second said gripper mechanism is in alignment with said first disk transfer point.

4. The apparatus of claim 3:

wherein said spindle includes a radially expandable mechanism for clamping said disk within said central round hole thereof;

wherein said first and second gripper mechanisms each include posts movable in directions perpendicular to said axis of said arm drive shaft for gripping said disk by said circular periphery thereof;

wherein said lifter includes a groove engaging said disk by a portion of said circular periphery thereof;

wherein said arm is movable parallel to said axis of said arm drive shaft between a first arm translational position, in which said arm is rotated by said arm drive means, and a second arm translational position, in which said disk is transferred between said gripper mechanism and said first spindle, and in which said disk is transferred between said gripper mechanism and said lifter.

5. The apparatus of claim 3, wherein said arm, during a 180-degree rotation thereof, simultaneously moves a first said disk from said first disk transfer point to said second disk transfer point and a second said disk from said second disk transfer point to said first disk transfer point.

6. The apparatus of claim 5, wherein said indexing means includes indexing drive means moving said cassette in a first direction so that said disks within said pockets are sequentially removed therefrom by said lifter, and opposite said first direction so that each said disk, having been moved past said first exposure point, is subsequently replaced in the pocket from which it was taken.

7. The apparatus of claim 6, comprising in addition disk sensing means operated by movement of said disk within said pocket past said lifter, wherein said indexing means moves said cassette in said first direction until said disk sensing means provides an output, and stops motion of said cassette in said first direction when said disk sensing means provides said output.

8. The apparatus of claim 6, comprising in addition bar code reading means for reading data encoded on a side of said cassette, wherein said indexing means moves said cassette in said first direction in response to said data.

9. The apparatus of claim 6, wherein said indexing means includes an indexing conveyor carrying said cassette, and wherein said apparatus comprises additionally:

a cassette input platform;

an input conveyor extending under said cassette input platform, and extending to said indexing conveyor, wherein said platform is movable between a raised position, in which said cassette placed thereon is held above and out of contact with said input conveyor, and a lowered position, in which said cassette thereon is moved into contact with said input conveyor;

input conveyor drive means operating said input conveyor to move said cassette thereon in a first direction toward said indexing means and opposite said first direction;

a first input cassette sensor providing a first input signal indicating presence of said cassette at said cassette input platform;

a second input cassette sensor providing a second input signal indicating presence of said cassette on said input conveyor near said indexing conveyor; and a third input cassette sensor providing a third input signal indicating presence of said cassette on said input conveyor near said cassette input platform.

10. The apparatus of claim 9, comprising in addition processing means making a first determination that all said disks to be textured within a first said cassette on said indexing conveyor have been textured:

wherein, in response to said first determination, said indexing conveyor is driven in said first direction to move said first said cassette off said indexing conveyor;

wherein, in response to said first determination together with said second input signal, said input conveyor is driven in said first direction to move a second said cassette off said input conveyor and onto said indexing conveyor;

wherein, in response to said first input signal in an absence of said second and third input signals, said cassette input platform is lowered, and said input conveyor is driven in said first direction until said second input signal is provided;

wherein, in response to said first input signal with said second input signal and in an absence of said third input signal, said input conveyor is driven opposite said first direction until said third input signal is provided, said input cassette platform is lowered, and said input conveyor is driven in said first direction until said second input signal is provided; and wherein, in response to said first input signal together with said second and third input signals, said cassette is held in said raised position.

11. The apparatus of claim 9, comprising additionally:

an output conveyor extending parallel and adjacent said input conveyor to a cassette output end adjacent said cassette input platform;

a transfer table movable between a first transfer table position, in which said transfer table is aligned with an output end of said indexing conveyor and a second transfer table position, in which said transfer table is aligned with an input end of said output conveyor;

transfer table translating drive means for moving said transfer table between said first and second transfer table positions;

a transfer table conveyor on said transfer table;

transfer table conveyor drive means operating said transfer table conveyor to move said cassette in said first direction onto said transfer table conveyor from said indexing conveyor and to move said cassette opposite said first direction onto said output conveyor from said transfer table conveyor;

a transfer table cassette sensor providing a transfer table signal indicating presence of said cassette on said transfer table conveyor;

a first output cassette sensor providing a first output signal indicating presence of said cassette at said cassette output end; and a second output cassette sensor providing a second output signal indicating presence of said cassette at said input end of said output conveyor.

12. The apparatus of claim 11, comprising in addition processing means making a first determination that all said disks to be textured within a first said cassette on said indexing conveyor have been textured:

wherein, in response to said first determination, said indexing conveyor and said transfer table conveyor are turned on to move said cassette on said indexing conveyor in said first direction from said indexing conveyor onto said transfer table conveyor;

wherein, in response to said transfer table signal, said indexing conveyor and said transfer table conveyor are turned on, and said transfer table is moved into alignment with said output conveyor;

wherein, in response to said transfer table alignment with said output conveyor and in absence of said first output signal, said transfer table conveyor and said output conveyor are turned on to move said cassette opposite said first direction from said transfer table conveyor onto said output conveyor, with movement of said output conveyor being stopped when said first output signal is provided; and wherein, in response to said transfer table alignment with said output conveyor occurring together with said first output signal, said input conveyor is turned on to move a first said cassette in said first direction until said second output signal is provided, and thereafter said input conveyor is turned on, along with said transfer table conveyor, to move said first said cassette and a second said cassette opposite said first direction until said first output signal is provided.

13. The apparatus of claim 11, comprising additionally:

a cassette output platform extending along an output end of said output conveyor, wherein said cassette output platform is movable between a lowered position, in which said cassette on said output conveyor is driven onto said cassette output platform, and a raised position, in which said cassette resting on said cassette output platform is held above and out of contact with said output conveyor; and a third output cassette sensor providing a third output signal indicating presence of said cassette approaching said cassette output platform on said output conveyor.

14. The apparatus of claim 13, comprising in addition processing means making a first determination that all said disks to be textured within a first said cassette on said indexing conveyor have been textured:

wherein, in response to said first determination, said indexing conveyor and said transfer table conveyor are turned on to move said cassette on said indexing conveyor in said first direction from said indexing conveyor onto said transfer table conveyor;

wherein, in response to said transfer table signal, said indexing conveyor and said transfer table conveyor are turned on, and said transfer table is moved into alignment with said output conveyor;

wherein, in response to said transfer table alignment with said output conveyor and in absence of said first and third output signals, said transfer table conveyor and said output conveyor are turned on to move said cassette opposite said first direction from said transfer table conveyor onto said output conveyor, with movement of said output conveyor being stopped and said cassette output platform being moved into said raised position thereof when said first output signal is provided;

wherein, in response to said transfer table alignment with said output conveyor and said first signal in an absence of said third signal, said transfer table conveyor and said output conveyor are turned on to move said cassette opposite said first direction from said transfer table conveyor onto said output conveyor, with movement of said output conveyor being stopped when said third output signal is provided;

wherein, in response to said transfer table alignment occurring together with said first and third output signals, said input conveyor is turned on to move a first said cassette in said first direction until said second output signal is provided, and thereafter said input conveyor is turned on, along with said transfer table conveyor, to move said first cassette and a second cassette opposite said first direction until said second output signal is provided; and wherein, with said second output signal being provided, when said second output signal is terminated, said output platform is lowered and said output conveyor is turned on to move said first cassette opposite said first direction until said first output signal is provided.

15. The apparatus of claim 1, wherein said optical system includes a beamsplitter, dividing said beam derived from said laser, directing a first portion of said beam to said first exposure point and a second portion of said beam to a second exposure point, wherein said first and second exposure points are on opposite sides of said disk engaged by said spindle.

16. Apparatus for texturing a plurality of disks, wherein each disk in said plurality thereof includes a central round hole, a circular periphery, and flat, parallel, opposite sides, and wherein said apparatus comprises:

a laser producing a pulsed laser beam;

a beamsplitter dividing said pulsed laser beam into first and second sub-beams;

a beam steering mirror directing said second sub-beam to travel parallel to said first sub-beam;

first and second disk-handling stations, wherein each said disk-handling station includes an exposure station in which portions of said opposite sides of said disks are exposed to said sub-beams; and a shuttling mirror assembly reflecting said first and second sub-beams, wherein said shunting mirror assembly is movable between a first shuttling mirror position, in which said first and second sub-beams are directed to travel toward said exposure station of said first disk-handling station, and a second shuttling mirror position, in which said first and second sub-beams are directed to travel toward said exposure station of said second disk-handling station.

17. The apparatus of claim 16:

wherein each said disk handling station includes a spindle having means for engaging said disk by said central hole thereof, with each said spindle being rotationally and translationally driven through said exposure station of said disk handling station as said disk engaged thereby is exposed to said first and second sub-beams;

wherein said disks within a first plurality thereof are changed on said spindle of said first disk-handling station, replacing a textured said disk with an untextured said disk, while said disk within a second plurality thereof is exposed to said first and second sub-beams on said spindle of said second disk-handling station; and wherein said disk within said first plurality thereof is exposed to said first and second sub-beams on said spindle of said first disk-handling station while said disks within said second plurality thereof are changed, replacing a textured said disk with an untextured said disk, on said spindle of said second disk-handling station.

18. The apparatus of claim 17, wherein each said disk handling station additionally includes:

indexing means for moving a cassette having a plurality of pockets, aligned with one another along a first direction, with each pocket within said plurality thereof providing a place for holding a single said disk, with each said pocket being open from above to allow insertion of said disk therein and removal of said disk therefrom, and with each said pocket having an access opening at the lower end thereof, incrementally said first direction;

a disk lifter moving upward through said access opening in said pocket to lift a disk contained therein to a first disk transfer point, with said pockets being placed sequentially at said disk lifter by incremented movement of said cassette by said indexing means; and a pick-and-place mechanism for moving said disk from said first disk transfer point to a second disk transfer point, where said disk is placed on said spindle.

19. The apparatus of claim 18, wherein said pick-and-place mechanism includes an arm rotatable by means of an arm drive shaft about an axis of aid arm drive shaft, wherein said arm extends through equal distances in opposite directions from said arm drive shaft;

a gripper mechanism at each end of said arm, adapted to grip and to release said disk;

arm drive means rotating said arm through a 180-degree angle between a first arm rotational position, in which a first said gripper mechanism is in alignment with said first disk transfer point while a second said gripper mechanism is in alignment with said second disk transfer point, and a second arm rotational position, in which said first said gripper mechanism is in alignment with said second disk transfer point while said second said gripper mechanism is in alignment with said first transfer point, wherein, during rotation through said 180-degree angle, two said disks are moved by said arm, with one of said disks being moved from said first disk transfer point to said second disk transfer point while another of said disks is moved from said second disk transfer point to said first disk transfer point.

20. The apparatus of claim 19:

wherein said disk lifter returns textured said disks to pockets within said cassette; and wherein said indexing means is an indexing conveyor additionally moving said cassette opposite said first direction to align said pocket from which said textured disk was taken with said disk lifter.

21. The apparatus of claim 20, wherein each said disk-handling station additionally includes:

an input conveyor supplying said cassettes to said indexing means, with input queuing means providing for queuing a plurality of said cassettes along said input conveyor; and an output conveyor moving from said indexing means to a cassette output area, with output queuing means providing for queuing a plurality of said cassettes along said output conveyor.

22. The apparatus of claim 21, wherein said input queuing means includes:

a platform at an end of said input conveyor, with said platform being movable between a raised position, in which said cassette when placed thereon is held away from said input conveyor, and a lowered position, in which said cassette placed thereon is moved with said conveyor;

an input cassette sensor determining presence of a cassette on said input conveyor between said platform and said indexing conveyor; and control means holding said platform in said raised position to allow a first said cassette on said input conveyor to be passed to said indexing conveyor without movement of a second said cassette on said platform.

23. The apparatus of claim 21, wherein said output queuing means includes:

first output cassette sensing means at said output end of said output conveyor;

second output cassette sensing means at an end of said output conveyor opposite said output end; and control means driving said output conveyor to move a first said cassette in an output direction to said first output cassette sensor, wherein, when a second said cassette is made ready to place on said output conveyor, said control means operates said output conveyor to return said first cassette opposite said output direction to said second output cassette sensor and then operates said output conveyor to drive said first and second said cassettes in said output direction until presence of said first cassette is detected by said first output cassette sensor.

*24. Apparatus for texturing a disk, including a central round hole, a circular periphery, and flat, parallel sides, removably held within a pocket of a cassette having a plurality of pockets, wherein said apparatus comprises:*

*a lifter movable to move said disk from said pocket holding said disk, by extending into said pocket, to a first disk transfer point;*

*indexing means for moving said cassette adjacent said lifter so that said lifter is movable into each pocket within said plurality of pockets;*

*a laser producing a pulsed laser beam;*

*an optical system directing a portion of said laser beam to a first exposure point;*

*a spindle engaging said disk at a second disk transfer point and moving said disk past said first exposure point; and*

*a pick-and-place mechanism, moving said disk from said first disk transfer point to said second disk transfer point.*

*25. The apparatus of claim 24:*

*wherein said spindle additionally returns said disk to said second disk transfer point;*

*wherein said pick-and-place mechanism additionally returns said disk from said second disk transfer point to said first disk transfer point; and*

*wherein said lifer additionally engages said disk at said first disk transfer point and returns said disk to a pocket within said first plurality thereof.*

*26. The apparatus of claim 25, wherein said pick-and-place mechanism comprises:*

*an arm rotatable by means of an arm drive shaft about an axis of said arm drive shaft, wherein said arm extends through equal distances in opposite directions from said arm drive shaft;*

*a gripper mechanism at each end of said arm, adapted to grip and to release said disk;*

*arm drive means rotating said arm through a 180-degree angle between a first arm rotational position, in which a first said gripper mechanism is in alignment with said first disk transfer point while a second said gripper*

*mechanism is in alignment with said second disk transfer point, and a second arm rotational position, in which said first said gripper mechanism is in alignment with said second disk transfer point while said second said gripper mechanism is in alignment with said first disk transfer point.*

*27. The apparatus of claim 26:*

*wherein said spindle includes a radially expandable mechanism for clamping said disk within said central round hole thereof;*

*wherein said first and second gripper mechanisms each include posts movable in directions perpendicular to said axis of said arm drive shaft for gripping said disk by said circular periphery thereof;*

*wherein said lifter includes a groove engaging said disk by a portion of said circular periphery thereof;*

*wherein said arm is movable parallel to said axis of said arm drive shaft between a first arm translational position, in which said arm is rotated by said arm drive means, and a second arm translational position, in which said disk is transferred between said gripper mechanism and said first spindle, and in which said disk is transferred between said gripper mechanism and said lifter.*

*28. The apparatus of claim 26, wherein said arm, during a 180-degree rotation thereof, simultaneously moves a first said disk from said first disk transfer point to said second disk transfer point and a second said disk from said second disk transfer point to said first disk transfer point.*

*29. The apparatus of claim 28, wherein said indexing means includes indexing drive means moving said cassette in a first direction so that said disks within said pockets are sequentially removed therefrom by said lifter, and opposite said first direction so that each said disk, having been moved past said first exposure point, is subsequently replaced in the pocket from which it was taken.*

*30. The apparatus of claim 29, comprising in addition disk sensing means operated by movement of said disk within said pocket past said lifter, wherein said indexing means moves said cassette in said first direction until said disk sensing means provides an output, and stops motion of said cassette in said first direction when said disk sensing means provides said output.*

*31. The apparatus of claim 29, comprising in addition bar code reading means for reading data encoded on a side of said cassette, wherein said indexing means moves said cassette in said first direction in response to said data.*

*32. The apparatus of claim 29, wherein said indexing means includes an indexing conveyor carrying said cassette, and wherein said apparatus comprises additionally:*

*a cassette input platform;*

*an input conveyor extending under said cassette input platform, and extending to said indexing conveyor, wherein said platform is movable between a raised position, in which said cassette placed thereon is held above and out of contact with said input conveyor, and a lowered position, in which said cassette thereon is moved into contact with said input conveyor;*

*an input conveyor drive means operating said input conveyor to move said cassette thereon in a first direction toward said indexing means and opposite said first direction;*

*a first input cassette sensor providing a first input signal indicating presence of said cassette at said cassette input platform;*

*a second input cassette sensor providing a second input signal indicating presence of said cassette on said input conveyor near said indexing conveyor; and*

*a third input cassette sensor providing a third input signal indicating presence of said cassette on said input conveyor near said cassette input platform.*

*33. The apparatus of claim 32, comprising in addition processing means making a first determination that all said disks to be textured within a first said cassette on said indexing conveyor have been textured:*

*wherein, in response to said first determination, said indexing conveyor is driven in said first direction to move said first said cassette off said indexing conveyor;*

*wherein, in response to said first determination together with said second input signal, said input conveyor is driven in said first direction to move a second said cassette off said input conveyor and onto said indexing conveyor;*

*wherein, in response to said first input signal in an absence of said second and third input signals, said cassette input platform is lowered, and said input conveyor is driven in said first direction until said second input signal is provided;*

*wherein, in response to said first input signal with said second input signal and in an absence of said third input signal, said input conveyor is driven opposite said first direction until said third input signal is provided, said input cassette platform is lowered, and said input conveyor is driven in said first direction until said second input signal is provided; and*

*wherein, in response to said first input signal together with said second and third input signals, said cassette is held in said raised position.*

*34. The apparatus of claim 32, comprising additionally:*

*an output conveyor extending parallel and adjacent said input conveyor to a cassette output end adjacent said cassette input platform;*

*a transfer table movable between a first transfer table position, in which said transfer table is aligned with an output end of said indexing conveyor and a second transfer table position, in which said transfer table is aligned with an input end of said output conveyor;*

*transfer table translating drive means for moving said transfer table between said first and second transfer table positions;*

*a transfer table conveyor on said transfer table;*

*transfer table conveyor drive means operating said transfer table conveyor to move said cassette in said first direction onto said transfer table conveyor from said indexing conveyor and to move said cassette opposite said first direction onto said output conveyor from said transfer table conveyor;*

*a transfer table cassette sensor providing a transfer table signal indicating presence of said cassette on said transfer table conveyor;*

*a first output cassette sensor providing a first output signal indicating presence of said cassette at said cassette output end; and*

*a second output cassette sensor providing a second output signal indicating presence of said cassette at said input end of said output conveyor.*

*35. The apparatus of claim 34, comprising in addition processing means making a first determining that all said disks to be textured within a first said cassette on said indexing conveyor have been textured;*

*wherein, in response to said first determination, said indexing conveyor and said transfer table conveyor are turned on to move said cassette on said indexing*

*conveyor in said first direction from said indexing conveyor onto said transfer table conveyor;*

*wherein, in response to said transfer table signal, said indexing conveyor and said transfer table conveyor are turned on, and said transfer table is moved into alignment with said output conveyor;*

*wherein, in response to said transfer table alignment with said output conveyor and in absence of said first output signal, said transfer table conveyor and said output conveyor are turned on to move said cassette opposite said first direction from said transfer table conveyor onto said output conveyor, with movement of said output conveyor being stopped when said first output signal is provided; and*

*wherein, in response to said transfer table alignment with said output conveyor occurring together with said first output signal, said input conveyor is turned on to move a first said cassette in said first direction until said second output signal is provided, and thereafter said input conveyor is turned on, along with said transfer table conveyor, to move said first said cassette and a second said cassette opposite said first direction until said first output signal is provided.*

*36. The apparatus of claim 34, comprising additionally:*

*a cassette output platform extending along an output end of said output conveyor, wherein said cassette output platform is movable between a lowered position, in which said cassette on said output conveyor is driven onto said cassette output platform, and a raised position, in which said cassette resting on said cassette output platform is held above and out of contact with said output conveyor; and*

*a third output cassette sensor providing a third output signal indicating presence of said cassette approaching said cassette output platform on said output conveyor.*

*37. The apparatus of claim 36, comprising in addition processing means making a first determination that all said disks to be textured within a first said cassette on said indexing conveyor have been textured;*

*wherein, in response to said first determination, said indexing conveyor and said transfer table conveyor are turned on to move said cassette on said indexing conveyor in said first direction from said indexing conveyor onto said transfer table conveyor;*

*wherein, in response to said transfer table signal, said indexing conveyor and said transfer table conveyor are turned on, and said transfer table is moved into alignment with said output conveyor;*

*wherein, in response to said transfer table alignment with said output conveyor and in absence of said first and third output signals, said transfer table conveyor and said output conveyor are turned on to move said cassette opposite said first direction from said transfer table conveyor onto said output conveyor, with movement of said output conveyor being stopped and said cassette output platform being moved into said raised position thereof when said first output signal is provided;*

*wherein, in response to said transfer table alignment with said output conveyor and said first signal in an absence of said third signal, said transfer table conveyor and said output conveyor are turned on to move said cassette opposite said first direction from said transfer table conveyor onto said output conveyor, with movement of said output conveyor being stopped when said third output signal is provided;*

*wherein, in response to said transfer table alignment occurring together with said first and third output signals, said input conveyor is turned on to move a first said cassette in said first direction until said second output signal is provided, and thereafter said input conveyor is turned on, along with said transfer table conveyor, to move said first cassette and a second cassette opposite said first direction until said second output signal is provided; and*

*wherein, with said second output signal being provided, when said second output signal is terminated, said output platform is lowered and said output conveyor is turned on to move said first cassette opposite said first direction until said first output signal is provided.*

*38. The apparatus of claim 24, wherein said optical system includes a beamsplitter, dividing said beam derived from said laser, directing a first portion of said beam to said first exposure point and a second portion of said beam to a second exposure point, wherein said first and second exposure points are on opposite sides of said disk engaged by said spindle.*

* * * * *